L. S. DUNN & E. GUELFF.
COMBINATION COOKING UTENSIL.
APPLICATION FILED MAR. 29, 1912.
1,063,516.
Patented June 3, 1913.
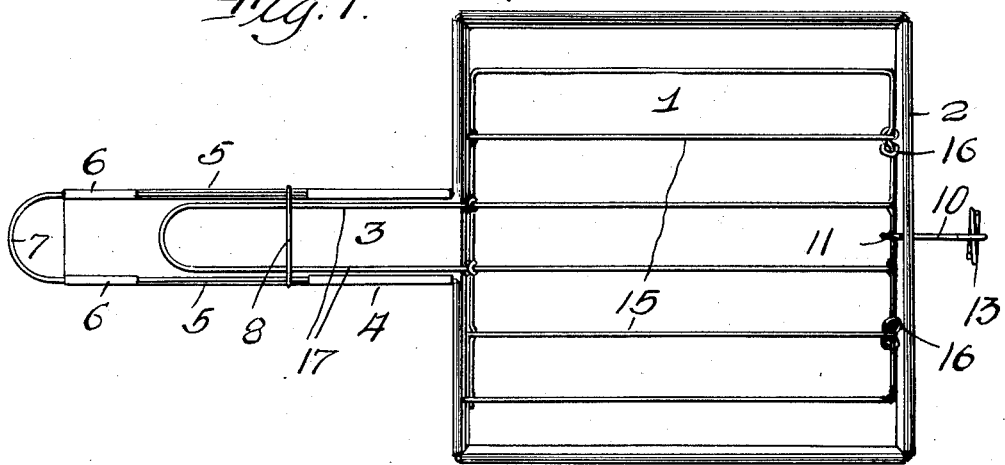
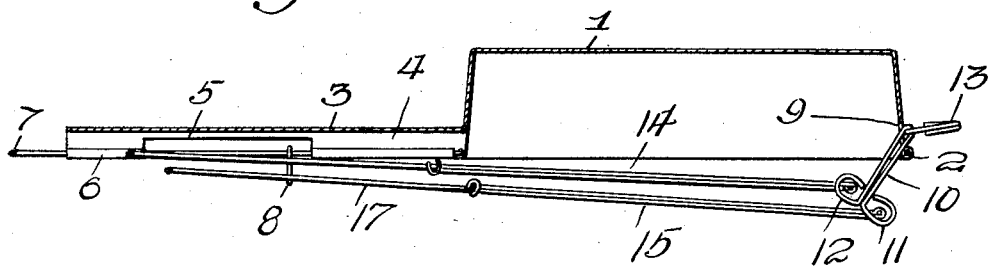
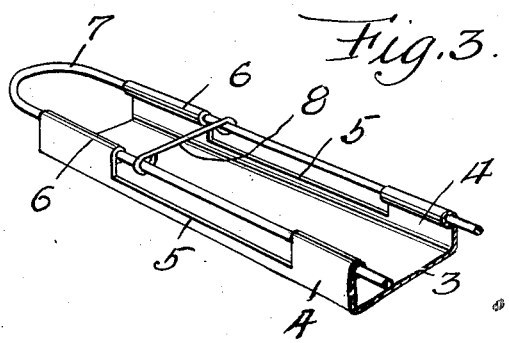
WITNESSES
INVENTORS
L. S. Dunn and
BY E. Guelff.
ATTORNEYS

UNITED STATES PATENT OFFICE.

LEON S. DUNN AND ELISCÉ GUELFF, OF POINT MARION, PENNSYLVANIA.

COMBINATION COOKING UTENSIL.

1,063,516. Specification of Letters Patent. Patented June 3, 1913.

Application filed March 29, 1912. Serial No. 687,255.

*To all whom it may concern:*

Be it known that we, LEON S. DUNN and ELISCÉ GUELFF, citizens of the United States of America, residing at Point Marion, in the county of Fayette and State of Pennsylvania, have invented certain new and useful Improvements in Combination Cooking Utensils, of which the following is a specification, reference being had therein to the accompanying drawing.

This invention relates to a combination cooking utensil particularly adapted for use by campers, and has for its object to provide a device of such class in a manner as hereinafter set forth embodying a skillet or frying pan, a toaster and a broiler.

Another object of this invention is to provide a compact cooking utensil that can be used for various purposes, the construction of the utensil being such as to be easily and safely manipulated over a fire.

A further object of this invention is to accomplish the above results by a mechanical construction that will be hereinafter specifically described and then claimed.

Reference will now be had to the drawing, wherein:—

Figure 1 is a plan of the utensil, Fig. 2 is a longitudinal sectional view of the same, and Fig. 3 is a perspective view of the handle of the utensil.

A cooking utensil in accordance with this invention comprises a pan or receptacle 1 that has a wire reinforced edge 2. Formed integral with the pan or receptacle 1 is a channel-shaped handle 3 that has the side walls 4 thereof cut away, as at 5. The edges of the side walls 4 are provided with barrels 6 for a wire reinforcement 7 that represents the continuation of the wire forming the reinforcement for the edges of the pan or receptacle 1. The wire reinforcement of the handle 3 provides guide rods at the cut away portions 5 of the walls 4 and slidably mounted upon said guide rods is a retaining bar 8.

The front wall of the pan or receptacle 1 has an opening 9 and movably mounted in said opening is a T-shaped link 10 having eyes 11 and 12. The T-shaped link 10 is retained within the opening 9 by a split ring 13, and loosely connected to the eyes 11 and 12 are toaster frames 14 and 15. These frames are made of wire and the frames are connected by links 16 that coöperate with the links 10 in loosely connecting the toaster frames together. The toaster frames have handles 17 and these handles are held together in alinement with the handle 3 of the pan or receptacle 1 by the bar 8.

With the utensil in an inverted position, as shown in Fig. 2, it can be used as a broiler, that is, a piece of meat can be placed in the pan or receptacle 1 and the toaster frames 14 and 15 closed and locked in a closed position by the bar 8 engaging the handle 17. The utensil can then be inverted whereby the piece of meat will rest upon the frame 14, and the utensil placed over a fire for broiling the meat.

It is obvious that the toaster frames 14 and 15 can be used for toasting purposes, even with the utensil inverted, or with the frames removed from the utensil by removing the split ring 13. Furthermore, it is apparent that the pan or receptacle can be used as a skillet for any cooking purposes, such as frying, boiling or stewing vegetables.

The cooking utensil can be made square as shown, round, or any other desired shape, and it is apparent that when used in inverted position over a hot fire, that the fumes arising from the cooking can be retarded by the pan 1 and consumed by the heat or flame of the fire, thereby preventing the fumes from spreading over a house.

Our invention is susceptible to such changes as fall within the scope of the appended claims.

What we claim is:—

1. A combination cooking utensil comprising a pan, a channel-shaped handle projecting therefrom, a portion of each of the sides of said handle being cut away, rods carried by the sides of said handle, a bar movably mounted upon said rods, said cut away portions of said sides providing clearances for said rods, toasting frames loosely and detachably connected to the front wall of said pan, and handles carried by said frame and adapted to be engaged by said bar whereby the handles are retained in engagement with the handle of the pan.

2. A combination cooking utensil comprising a pan with a handle and further having its front formed with an opening, a T-shaped member having its stem extending through said member and means engaging with said stem for detachably connecting it to said pan, the head of said member formed of a forward and rearward loop, a toasting frame having its forward end connected to said rear loop and provided with a handle, and a toasting frame arranged from the first mentioned frame and having its forward end connected to said forward loop and provided with a handle.

3. A combination cooking utensil comprising a pan with a handle and further having its front formed with an opening, a T-shaped member having its stem extending through said member and means engaging with said stem for detachably connecting it to said pan, the head of said member formed of a forward and rearward loop, a toasting frame having its forward end connected to said rear loop and provided with a handle, a toasting frame arranged from the first mentioned frame and having its forward end connected to said forward loop and provided with a handle, and means carried by the handle of the pan and capable of overlapping the handle of the second mentioned frame for connecting the handle of the frame to the handle of the pan.

In testimony whereof we affix our signatures in the presence of two witnesses.

LEON S. DUNN.
ELISCÉ GUELFF.

Witnesses:
HENRY CHAMPAGNE,
ALPHONSE BROGNEAUX.

Copies of this patent may be obtained for five cents each, by addressing the "Commissioner of Patents, Washington, D. C."